United States Patent
Lin et al.

(10) Patent No.: US 10,474,135 B2
(45) Date of Patent: Nov. 12, 2019

(54) THREE DIMENSIONAL PRINTING METHOD

(71) Applicants: XYZprinting, Inc., New Taipei (TW); Kinpo Electronics, Inc., New Taipei (TW)

(72) Inventors: Tsai-Yi Lin, New Taipei (TW); Chien-Te Lee, New Taipei (TW); Chen-Fu Huang, New Taipei (TW); An-Hsiu Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/943,718

(22) Filed: Apr. 3, 2018

(65) Prior Publication Data

US 2019/0171184 A1 Jun. 6, 2019

(30) Foreign Application Priority Data

Dec. 4, 2017 (CN) .......................... 2017 1 1259787

(51) Int. Cl.
*G06F 19/00* (2018.01)
*G05B 19/4099* (2006.01)
(Continued)

(52) U.S. Cl.
CPC ........ *G05B 19/4099* (2013.01); *B29C 64/124* (2017.08); *B29C 64/129* (2017.08);
(Continued)

(58) Field of Classification Search
CPC ... G03F 7/0037; G03F 7/027; B05C 11/1034; B05C 5/0225; H01L 2224/48091;
(Continued)

(56) References Cited

U.S. PATENT DOCUMENTS 7,256,912 B2 * 8/2007 Chang .................. H04N 1/6033
  347/15
8,998,601 B2 4/2015 Busato
(Continued)

FOREIGN PATENT DOCUMENTS

DE 102007010624 9/2008
EP 3219470 9/2017
(Continued)

OTHER PUBLICATIONS

"Search Report of Europe Counterpart Application", dated Nov. 16, 2018, p. 1-p. 7.

*Primary Examiner* — Kidest Bahta
(74) *Attorney, Agent, or Firm* — JCIPRNET

(57) ABSTRACT

A 3D printing method adapted for a 3D printer is provided. The 3D printer includes a tank filled with a liquid-state forming material, a platform, a curing module and a control module. At least one of the tank and the platform as well as the curing module are electrically connected to the control module to be controlled by the same, and a 3D object is formed on the platform. The 3D printing method includes analyzing a model of the 3D object to obtain a layered information; the control module correspondingly distributes the layered information at a plurality of forming positions at the bottom of the tank. A forming layer is cured by the curing module and located at a forming position, and then the platform and the tank rotate relatively to move the forming layer to another forming position, and another forming layer is formed at the another forming position.

11 Claims, 5 Drawing Sheets

(51) Int. Cl.
   *B29C 64/129* (2017.01)
   *B29C 64/393* (2017.01)
   *B29C 64/124* (2017.01)
   *B33Y 50/02* (2015.01)
   *B33Y 10/00* (2015.01)
   *B29C 64/241* (2017.01)

(52) U.S. Cl.
   CPC .......... *B29C 64/393* (2017.08); *B29C 64/241* (2017.08); *B33Y 10/00* (2014.12); *B33Y 50/02* (2014.12); *G05B 2219/49007* (2013.01); *G05B 2219/49023* (2013.01)

(58) Field of Classification Search
   CPC .... H01L 2924/00014; A43D 8/00; A61J 3/06; B01F 7/00216; B01F 7/00541; B01F 7/00908
   See application file for complete search history.

(56) References Cited

U.S. PATENT DOCUMENTS

| | | |
|---|---|---|
| 9,827,713 B1 | 11/2017 | Linnell et al. |
| 2008/0187711 A1* | 8/2008 | Alam ................ B22F 3/105 428/114 |
| 2008/0218542 A1* | 9/2008 | Tezuka ............... B41J 3/4073 347/8 |
| 2009/0211080 A1* | 8/2009 | Gowland .......... G01R 33/3873 29/602.1 |
| 2010/0291304 A1* | 11/2010 | Becker ................ H05K 3/00 427/355 |
| 2012/0218338 A1* | 8/2012 | Kanamura ........... B41J 3/407 347/15 |
| 2014/0339741 A1 | 11/2014 | Aghababaie et al. |
| 2016/0096331 A1 | 4/2016 | Linnell et al. |
| 2017/0252806 A1 | 9/2017 | Wienberg |
| 2018/0169969 A1 | 6/2018 | Deleon et al. |

FOREIGN PATENT DOCUMENTS

| | | |
|---|---|---|
| JP | 2012505773 | 3/2012 |
| JP | 2016508086 | 3/2016 |
| JP | 2016540665 | 12/2016 |
| JP | 2017165084 | 9/2017 |
| WO | 2010045950 | 4/2010 |

* cited by examiner

THREE DIMENSIONAL PRINTING METHOD

CROSS-REFERENCE TO RELATED APPLICATION

This application claims the priority benefit of China application serial no. 201711259787.3, filed on Dec. 4, 2017. The entirety of the above-mentioned patent application is hereby incorporated by reference herein and made a part of this specification.

BACKGROUND

Technical Field

The disclosure is related to a printing method.

Description of Related Art

In recent years, three-dimensional (3D) printers have been commonly applied in various fields. A variety of 3D printing technologies have been developed, which brings a new era where everything can be printed. Specifically, photopolymer is a liquid-state forming material used for most 3D printers, such as stereolithography apparatus (SLA), digital light processing (DLP) and continuous liquid interface production (CLIP) technologies, all of which utilize the liquid-state forming material, e.g., photopolymer, as a printing material.

Here, a pulled-up stereolithography technology is described as an example, which brings a platform vertically into a tank to be in contact with a liquid-state forming material, and a curing light source underneath the tank provides light that passes through the tank to cure the liquid-state forming material between the platform and the tank and form a forming layer. Thereafter, the forming layer is peeled off from the bottom of tank so that the forming layer can be attached to the platform and then stacked into a forming layer on the platform layer by layer, thereby completing a 3D object.

However, in the peeling process, since it is required to perform physical pulling action so as to smoothly remove the forming layer from the bottom of tank, such action causes whitening event in the bottom of the tank because of the curing operation constantly performed on the liquid-state forming material as well as the pulling action performed on the forming layer. As a result, the light that needs to pass through the tank and cure the liquid-state forming material is affected, for example, the precision and energy of the light are reduced and the service life of the tank is also decreased. Also, since the tank needs to be replaced, the replacement frequency is likely to be high and the manufacturing cost might be increased accordingly.

In view of the above, it is an issue to be solved by persons skilled in the art to improve utilization efficiency, i.e., service life, of the tank and maintain the printing quality of 3D object.

SUMMARY

The disclosure is related to a three-dimensional (3D) printing method for improving utilization efficiency and service life of a tank.

According to an embodiment of the disclosure, a 3D printing method is adapted for a 3D printer. The 3D printer includes a tank, a platform, a curing module and a control module. The tank is filled with a liquid-state forming material, the control module is electrically connected to the tank, the platform and the curing module respectively to perform control so as to form a 3D object on the platform. The 3D printing method is characterized in that the 3D printing method includes a model for analyzing the 3D object to obtain layered information $\{A_m\}=A_1, A_2, A_3, \ldots A_x$ of the 3D object, wherein m and x are positive integers, and $x \geq 2$; the control module correspondingly distributes the layered information at a plurality of forming positions $\{P_n\}=P_1, P_2, P_3, \ldots, P_y$ at the bottom of the tank, wherein n and y are positive integers, and $y \geq 2$; and the control module drives the platform to be moved into the tank to be in contact with the liquid-state forming material, and drives the curing module to cure the liquid-state forming material at the forming position $(P_n)$, and after a forming layer $(A_m)$ being formed on the platform, the control module drives the tank to rotate relative to the platform to remove the forming layer $(A_m)$ from the tank. Also, after the forming layer $(A_m)$ being removed from the forming position $(P_n)$ and the forming layer corresponding to another forming position $(P_{n+1})$, the control module drives the curing module again to cure the liquid-state forming material at the another forming position $(P_{n+1})$ to form and stack another forming layer $(A_{m+1})$ on the forming layer $(A_m)$ until the 3D object is completed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1:
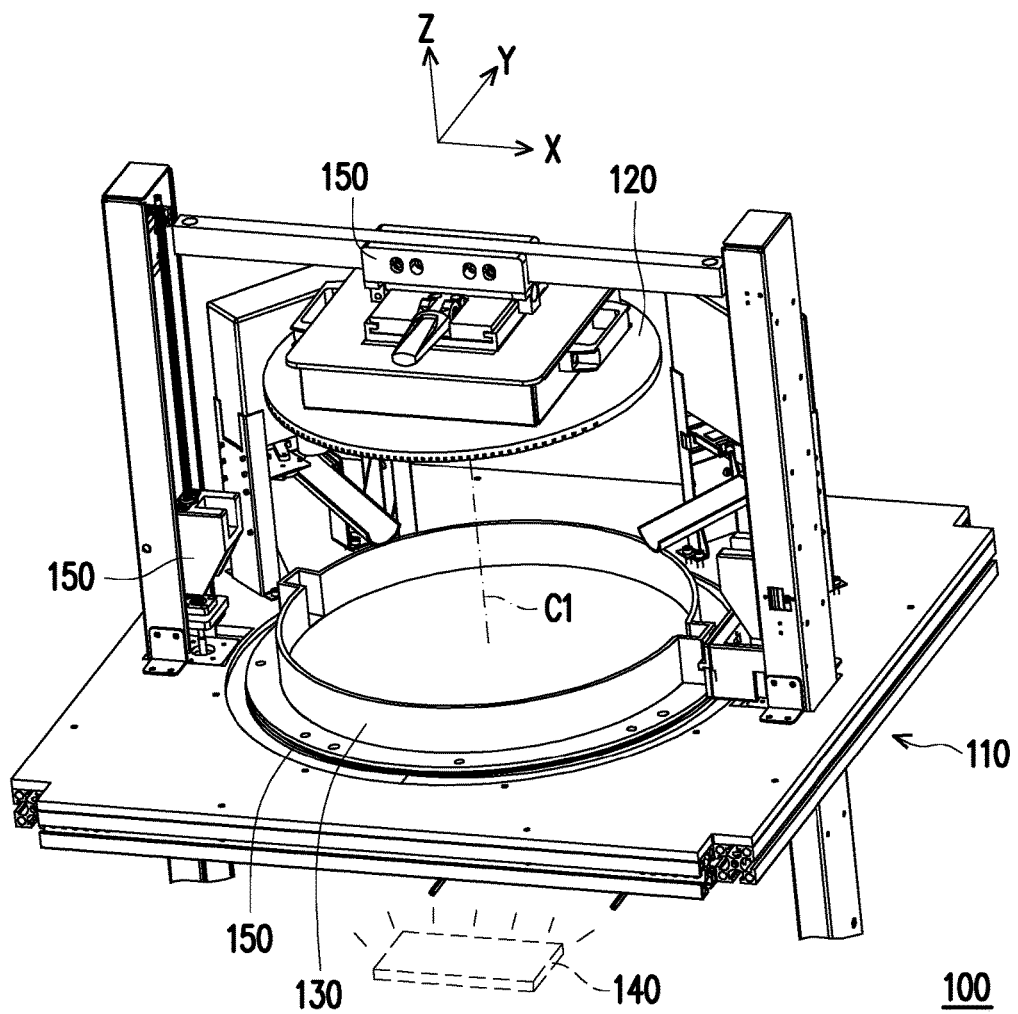
FIG. 1 is a schematic view of a three-dimensional (3D) printer.

Reference will now be made in detail to the present preferred embodiments of the invention, examples of which are illustrated in the accompanying drawings. Wherever possible, the same reference numbers are used in the drawings and the description to refer to the same or like parts.

Figure 2:
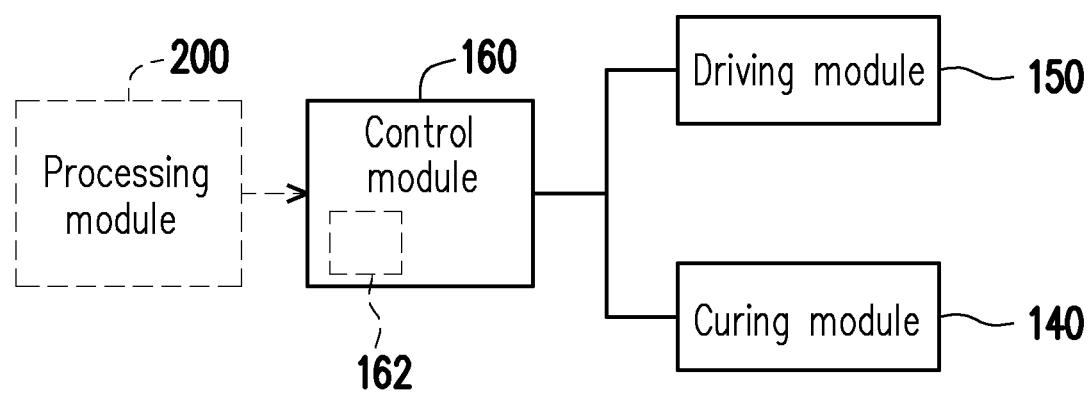
FIG. 2 is a schematic diagram illustrating electrical connections of partial components in a 3D printer.

FIG. 1 is a schematic view of a three-dimensional (3D) printer. FIG. 2 is a schematic diagram illustrating electrical connections of partial components in a 3D printer. Here, an rectangular coordinate X-Y-Z is provided to facilitate the component description. Referring to FIG. 1 and FIG. 2, in the embodiment, a 3D printer 100, e.g., a stereolithography device, includes a base 110, a platform 120, a tank 130, a curing module 140, a driving module 150 and a control module 160. Here, as shown in FIG. 1, the driving module 150 includes a gantry moving platform disposed on the base 110. The platform 120 is disposed on the gantry moving platform to be driven and moved on an X-Z plane. Furthermore, the driving module 150 further includes a rotating mechanism disposed on the base 110, and the tank 130 is disposed on the rotating mechanism to be able to rotate about a rotating axis C1 (the rotating axis C1 is parallel with Z axis) relative to the platform 120. The driving module 150 can be derived from existing movement mechanism, and thus no further descriptions are incorporated herein. Here, the driving module 150 is electrically connected to and controlled by the control module 160 to facilitate the driving operation mentioned above.

The tank 130 is filled with the liquid-state forming material (e.g., photopolymer). The curing module 140 is disposed underneath the base 110 and electrically connected to the control module 160. When the platform 120 is driven to be immersed in the liquid-state forming material in the tank 130, the control module 160 provides a curing light (e.g., ultraviolet light) through driving the curing module 140, and the curing light passes through the bottom of the tank 130 to cure the liquid-state forming material. In this manner, the liquid-state forming material is cured to form a forming layer. Also, through the pulling action (i.e., the platform is driven to move toward the positive Z-axis direction to be away from the bottom of the tank 130) between the platform 120 and the tank 130, the forming layer is peeled off from the bottom of the tank 130, thereby attaining the purpose of forming the forming layer on the platform 120. In this manner, the forming layer is stacked on the platform 120 layer by layer as described above until the printing process of the 3D object is finally completed. The means for forming the 3D object and corresponding components of the 3D printer 100 can be derived from the stereolithography device technology, and thus no further descriptions are incorporated herein.

In the embodiment, the bottom of the tank 130 is formed of a transparent silicone material to facilitate the curing light to pass through and reduce the adhesion between the bottom of the tank 130 and the forming layer, such that the pulling action can be performed smoothly. However, as mentioned above, the bottom of the tank 130 constantly undergoes the process that the liquid-state forming material is cured to form a forming layer and attached to the bottom of the tank, and the forming layer is pulled to be removed from the bottom of the tank 130. Under the interaction of the above-mentioned actions, whitening effect is generated in the related regions of the bottom of the tank 130 because the utilization frequency is increased.

Accordingly, the following 3D printing method provided by the invention is proposed to avoid the whitening effect. FIG. 3A to FIG. 3D are schematic views of steps of a 3D printing method. FIG. 4 is a flowchart of a 3D printing method. Referring to FIG. 3A to FIG. 3D and corresponding to the steps shown in FIG. 4, in the embodiment, the curing light provided by the curing module 140 has a fixed irradiating angle and range relative to the tank 130, and thus switching different forming positions through rotating the tank 130. First of all, in step S110, the model of the 3D object is analyzed first to obtain layered information $\{A_m\}=A_1, A_2, A_3, \ldots, A_x$ of the 3D object, wherein m and x are positive integers, x≥2. Here, it should be pointed out that the layered information of the embodiment may be performed in a processing unit 162 of the control module 160, and may be analyzed by a processing module 200 of an external device first, then the obtained information is input to the 3D printer 100 to execute related commands. Alternatively, both of the operations can be performed in cooperation; the disclosure provides no limitation thereto.

Thereafter, in step S120, the control module 160 distributes the layered information $\{A_m\}$ correspondingly at a plurality of forming positions $\{P_n\}=P_1, P_2, P_3, \ldots, P_y$ at the bottom of the tank 130 according to the layered information $\{A_m\}$, wherein n and y are positive integers, and y≥2. Subsequently, the control module 160 drives the platform 120, the tank 130 and the curing module 140 to start the printing operation according to the layered information $\{A_m\}$ and the forming position $\{P_n\}$.

When the above-mentioned corresponding operation is completed, the 3D printing operation may begin to be performed. Only the forming action of a portion of forming layer is described below for exemplary purpose. In the embodiment, the control module 160 drives the curing module 140 in step S130 first to cure the liquid-state forming material to complete the forming layer, that is, to cure the liquid-state forming material at the forming position ($P_n$) to form the forming layer ($A_m$). Subsequently, the control module 160 drives the tank 130 in step S140 to rotate about the rotating axis C1 relative to the platform 120; also, through incorporating the pulling action through which the platform 120 is controlled to move away from the bottom of the tank 130 along the Z-axis, the forming layer ($A_m$) is removed from the bottom of the tank 130 but still attached to the platform 120. Thereafter, in step S150, the control module 160 determines whether the 3D object is completed; if so, the current manufacturing process is finished; if not, it means that the printing operation of the next forming layer is to be continued. Therefore, in step S160, the control module 160 sets the n to be n+1, and sets the m to be m+1; then, in step S170, the control module 160 drives the tank 130 to rotate relative to the platform 120 so that the platform 120 (or forming layer ($A_m$)) corresponds to another forming position ($P_{n+1}$). In this manner, the 3D printer 100 can proceed with step S130 and step S140 to print another forming layer ($A_{m+1}$) and remove the same from the tank 130 until printing operation of the 3D object is completed.

Figure 3A:
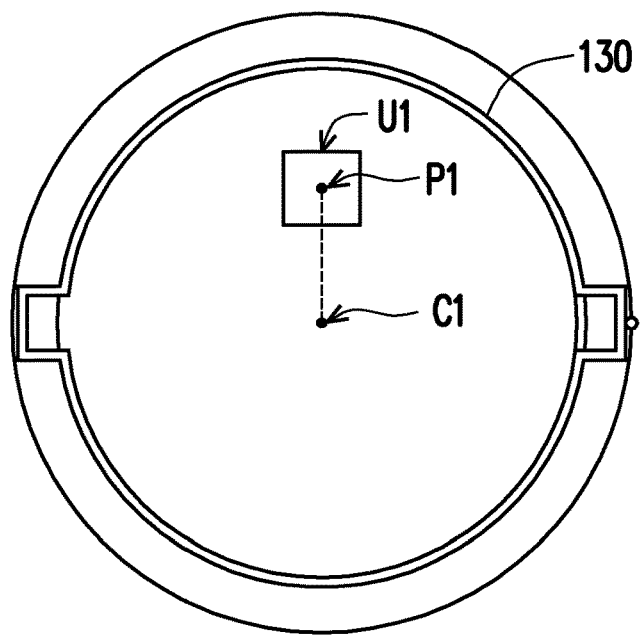
FIG. 3A to FIG. 3D are schematic views of steps of a 3D printing method.

Here, FIG. 3A to FIG. 3D are illustrated to exemplify the printing operation of two of the forming layers and the platform 120 is omitted. First of all, as shown in FIG. 3A, the curing module 140 is controlled to cure the liquid-state forming material at the forming position P1 to form the forming layer. Here, a contour of the orthogonal projection of the forming layer $\{A_m\}$ at the bottom of the tank 130 is denoted as $\{U_m\}$ to represent the forming layer $\{A_m\}$, and the platform 120 is omitted to facilitate related descriptions. However, it should be noted that, the contour of orthogonal projection is subject to the contour of the shape of each forming layer after the 3D object is layered. Here, for ease of description, a 3D object in the shape of square pillar is described for exemplary purpose. That is, the layered forming layer has the square pillar-shaped contour.

Figure 3B:
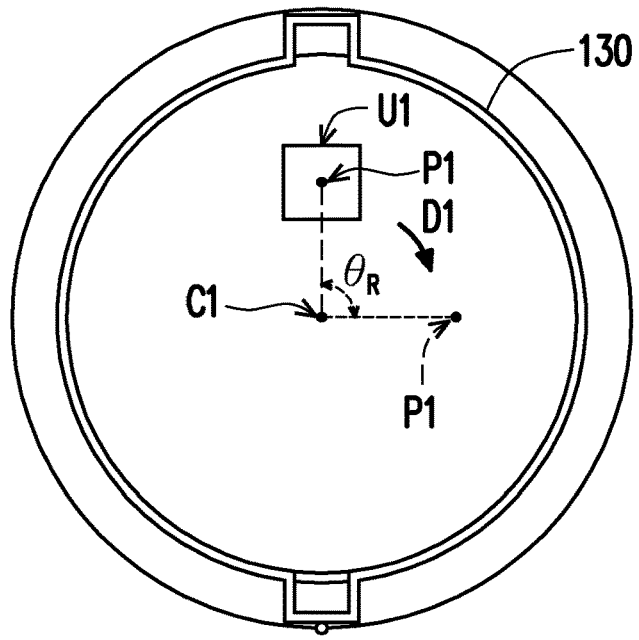
Figure 3C:
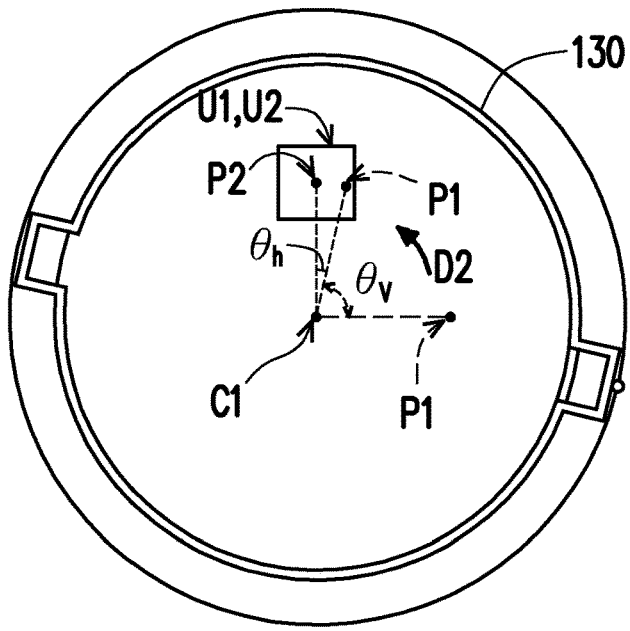
Figure 3D:
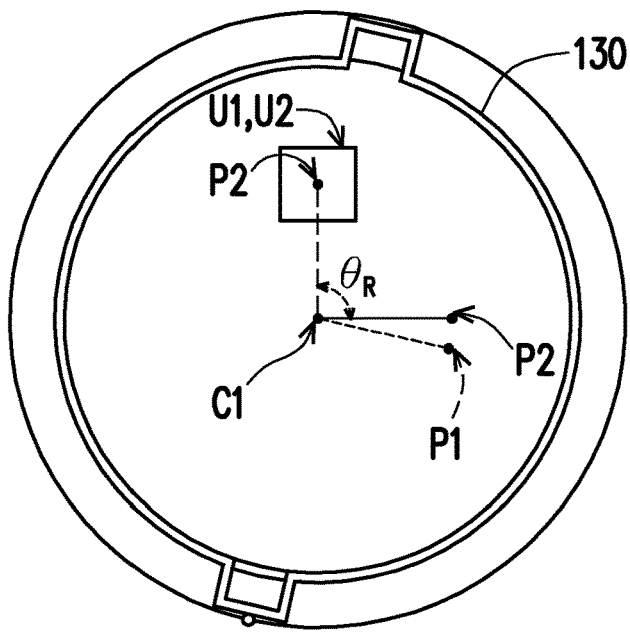
Figure 4:
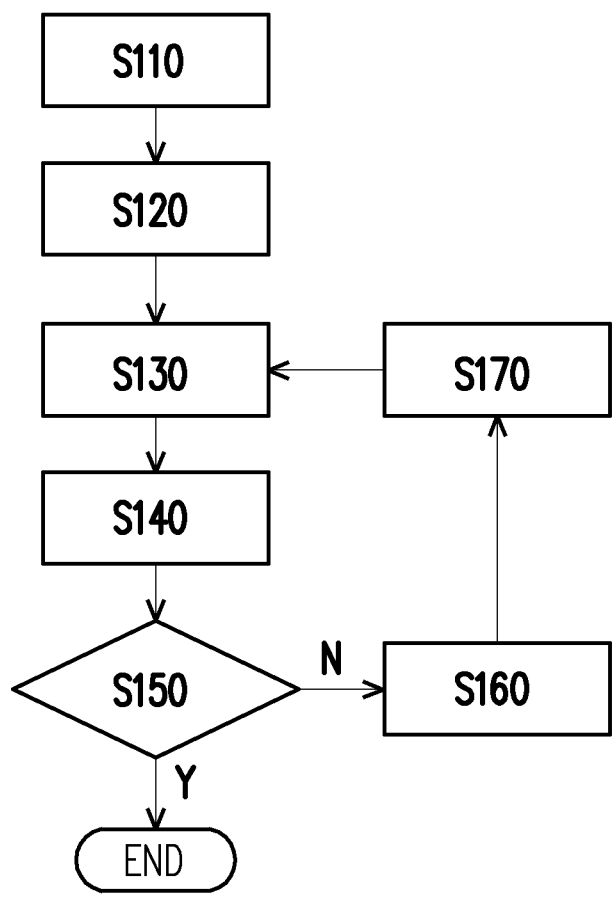
FIG. 4 is a flowchart of a 3D printing method.

Thereafter, from the process of FIG. 3A to FIG. 3C and corresponding to the pulling action illustrated in step S140, that is, after the forming layer ($A_1$) is completed, the contour U1 of the orthogonal projection is removed from the forming position P1 due to rotation of the tank 130. Next, as shown in FIG. 3C, when the printing operation of the next forming layer is performed, the control module 160 drives the tank 130 first to rotate about the rotating axis C1 relative to the platform 120, which then causes the orthogonal projection contour U1 to correspond to another forming position P2. In this manner, the control module 160 can further drive the curing module 140 to provide the curing light to pass through another forming position P2 of the tank 130 to cure the liquid-state forming material corresponding to the position (P2) to form the forming layer (i.e., contour U2). Similarly, the processes in FIG. 3C to FIG. 3D show the removing action after the forming layer is completed, that is, the orthogonal projection contour U2 is removed from the forming position P2 so that the forming layer can be peeled off from the tank 130 smoothly.

Specifically, when the forming layer is to be removed, the control module 160 drives the tank 130 to rotate by a removing angle ($\theta_R$), as shown in FIG. 3A to FIG. 3B, the forming position P1 of the tank 130 is removed from the forming layer ($A_1$) (or orthogonal projection contour U1). FIG. 3B is illustrated with dashed line to show that the forming position P1 represents the state thereof in FIG. 3A in order to exemplify the removing angle ($\theta_R$) and that the tank 130 is rotated along a first direction D1. In other words, FIG. 3B is illustrated with solid line to show that the forming position P1 is the forming position P1 in FIG. 3A, and FIG. 3B is illustrated with dashed line to show that the forming position P1 is in the state of rotating by the removing angle ($\theta_R$). Furthermore, before the printing operation of the next forming layer is to be performed, the control module 160 drives the tank 130 to rotate by a returning angle ($\theta_V$), as shown in FIG. 3C, the tank 130 is rotated and restored along a second direction D2 (the second direction D2 is opposite to the first direction D1). However, the previous forming position P1 is not completely restored, that is, $\theta_1 \neq \theta_V$. In this manner, the curing light can pass through the new forming position P2 at the bottom of the tank 130 to cure the liquid-state forming material on the new forming position P2 to form the forming layer (as exemplified by the contour U2 of orthogonal projection). More specifically, the control module 160 in the embodiment drives the tank 130 to rotate at a better efficiency (minimum rotating angle). Therefore, in the embodiment, $\theta_R > \theta_V$. In other words, the tank 130 has a relative rotating angle ($\theta_h$) formed between the forming position ($P_n$) and another forming position ($P_{n+1}$). For example, FIG. 3C shows that a relative rotating angle ($\theta_h$) is formed between the forming positions P1 and P2, wherein $\theta_h = \theta_R - \theta_V$. Here, the minimum rotating angle is substantially smaller than 180°, thereby improving the rotating efficiency (reduce the time required for rotation) of the tank 130.

In this manner, the forming position P2 has rotating misalignment relative to the forming position P1. In other words, between two adjacent forming layers, there is misalignment at the position where the curing light passes through the bottom of the tank 130, such that the two adjacent forming layers respectively correspond to different forming positions of the tank 130, which means that there is misalignment between each forming layer and the adhesion region at the bottom of the tank 130 as shown in the forming position, thereby avoiding repeating the operations of printing the forming layer and removing the forming layer at the same position. Accordingly, the problem of whitening effect that is easily occurred at the bottom of the tank 130 caused by curing light constantly penetrating through a same position of the tank can be effectively solved.

The embodiment shows that the relative rotating angle ($\theta_h$) is preferably 5°, but it is still subject to the layered information of the 3D object. In other words, the relative rotating angle ($\theta_h$) varies depending on the contour and area of the forming layer.

Not only that the forming position has rotating misalignment, it is also required that the relative rotating angle ($\theta_h$) described in the embodiment allow the contours of orthogonal projection of the forming layer at the bottom of the tank 130 to be in partially overlapping state before/after operation, that is, the orthogonal projection contours U1 and U2 overlap each other as shown in FIG. 3C, thereby ensuring that the quality of the forming layer is not affected by the difference (e.g., height difference) in the surface of the bottom of the tank 130. In addition, the forming position is disposed to be deviated from the rotating axis C1 of the tank 130 in order to easily generate the rotating misalignment and achieve the effect of removing smoothly.

In another embodiment that is not shown, the first direction D1 and the second direction D2 may be changed to be in the same direction, that is, the removing angle ($\theta_R$) by which the tank 130 is rotated is set to be in the same direction as the returning angle ($\theta_V$). However, in order to allow the forming positions of the adjacent forming layers on the tank 130 to keep the effect of rotating misalignment, $\theta_V \neq u*(360°-\theta_R)$, wherein u is a positive integer.

In the embodiment, the layered information $\{A_m\}$ of the 3D object and the forming position $\{P_n\}$ are in a state where n=m. In other words, the layered information $\{A_m\}$ and forming position $\{P_n\}$ are in a one-to-one corresponding relationship. The control module 160 disposes corresponding different forming positions $\{P_n\}$ at the bottom of the tank 130 according to the layered information $\{A_m\}$.

In another embodiment, it may be a state where n<m. In other words, the same forming position still serves for printing at least two forming layers, which is subject to the characteristic of the material of the bottom of the tank 130 and can be changed as appropriate.

In addition, since the tank and the movement model described in the embodiment belong to a repeated surrounding path, after the multiple forming layers are completed and distributed at different positions of the bottom of the tank and the forming positions of the multiple forming layers are distributed around (i.e., 360°) the bottom of the tank, it is likely that the subsequent printing layer overlaps the initial forming layer at the same position. At this time, on the premise that the same forming position should not be repeated, it is necessary to adjust the relative rotating angle between the forming positions. In other words, when the number of the forming positions $\{P_n\}$ corresponding to the layered information $\{A_m\}$ is distributed over 360° at the bottom of the tank 130, it is necessary to provide another relative rotating angle ($\theta_r$), so that the control module 160 drives the tank 130 by another rotating angle ($\theta_r$) to rotate relative to the platform 120 after the forming layer $A_z$ is completed, wherein z=360°/($\theta_h$), z<x, and ($\theta_r$)≠($\theta_h$). For example, when x=10 and $\theta_r$=45°, it represents that, after a forming layer $A_8$ is completed, a forming layer $A_9$ to be printed would be printed at the repeated forming position. Therefore, at this time, it is required to provide another relative rotating angle ($\theta_r$) to avoid that the forming layer ($A_9$) is printed at the forming position ($P_1$). The previous embodiment is mainly implemented when 360°/($\theta_h$) is divisible. However, when 360°/($\theta_h$) is not divisible, the previous embodiment can still be selectively implemented; for example, when 360°/($\theta_h$) is not divisible, z is rounded to an integer.

However, at this time, said another relative rotating angle ($\theta_r$) may be formed when the forming layer ($A_z$) is completed and the control module 160 drives the tank 130 to rotate relative to the platform 120 to remove the forming layer ($A_z$) from the tank 130. Likewise, said another relative rotating angle ($\theta_r$) may be an angle by which the control module 160 drives the tank 130 again to rotate relative to the platform 120 after the forming layer ($A_z$) is completed and the control module 160 drives the tank 130 to rotate relative to the platform 120 to remove the forming layer ($A_z$) from the tank 130.

Additionally, the reversing operation makes it easier to control the tank 130. For example, when the pulling action is performed, rotating by 90 degrees is likely to make pulling more easily than rotating by 5 degrees, and thus the rotation is reversed by 85 degrees to achieve the actual situation that there is 5 degree difference between the positions of the two forming layers. Another advantage is that the reversing rotation brings disturbance to the liquid-state forming material to consume energy accumulation and reduce whitening effect. However, in another embodiment, the control module 160 may drive the tank 130 to rotate continuously along a single direction (e.g., by accurately controlling the tank 130 to rotate by only 5 degrees to a position) without performing the above-mentioned reversing operation.

In summary, the embodiments of the invention make the control module to drive the tank to rotate so that each of the forming layers of the 3D object corresponds to different positions of the bottom of the tank, thereby avoiding performing printing and pulling operations at the repeated position to cause whitening effect at the bottom of tank. Accordingly, the invention provides a better utilization means for the bottom of the tank, increases utilization of the bottom of the tank while improving the service life of the tank and ensuring the printing quality of the forming layer and the 3D object.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional (3D) printing method, adapted for a 3D printer, the 3D printer comprising a tank, a platform, a curing module and a control module, the tank filled with a liquid-state forming material, the control module electrically connected to the tank, the platform and the curing module respectively to perform control to form a 3D object on the platform, characterized in comprising:

analyzing a model of the 3D object to obtain a layered information $\{A_m\}=A_1, A_2, A_3, \ldots, A_x$ of the 3D object, m and x being positive integers, and x≥2;

the control module distributing the layered information at a plurality of forming positions $\{P_n\}=P_1, P_2, P_3, \ldots, P_y$ at a bottom of the tank, n and y being positive integers, and y≥2; and the control module driving the platform to be moved to the tank to contact the liquid-state forming material, and driving the curing module to cure the liquid-state forming material at a forming position $(P_n)$, and after a forming layer $(A_m)$ being formed on the platform, the control module driving the tank to rotate relative to the platform, such that after the forming layer $(A_m)$ is removed from the forming position $(P_n)$ and the forming layer $(A_m)$ corresponds to another forming position $(P_{n+1})$, the control module driving the curing module again to cure the liquid-state forming material at said another forming position $(P_{n+1})$ to form and stack another forming layer $(A_{m+1})$ on the forming layer $(A_m)$ until the 3D object is completed.

2. The 3D printing method as claimed in claim 1, characterized in that the bottom of the tank is a transparent silicone material, the liquid-state forming material is a photopolymer, the curing module is a curing light for penetrating through the forming position $\{P_n\}$ of the tank.

3. The 3D printing method as claimed in claim 1, characterized in that the plurality of forming positions $\{P_n\}$ are deviated from a rotating axis of the tank.

4. The 3D printing method as claimed in claim 1, characterized in that a contour of an orthogonal projection of the forming layer $(A_m)$ at the bottom of the tank partially overlaps a contour of an orthogonal projection of said another forming layer $(A_{m+1})$ at the bottom of the tank.

5. The 3D printing method as claimed in claim 1, characterized in further comprising:

after the forming layer $(A_m)$ is completed, the control module driving the tank to rotate by an removing angle $(\theta_R)$ relative to the platform such that the forming layer $(A_m)$ is removed from the forming position $(P_n)$; and the control module driving the tank again to rotate by a returning angle $(\theta_V)$ relative to the platform such that the forming layer $(A_m)$ is moved to said another forming position $(P_{n+1})$.

6. The 3D printing method as claimed in claim 5, characterized in that a direction of the removing angle $(\theta_R)$ by which the tank is rotated is opposite to a direction of the returning angle $(\theta_V)$, and $\theta_R \neq \theta_V$.

7. The 3D printing method as claimed in claim 5, characterized in that a direction of the removing angle $(\theta_R)$ by which the tank is rotated is the same as a direction of the returning angle $(\theta_V)$, and $\theta_V \neq u*(360°-\theta_R)$, u is a positive integer.

8. The 3D printing method as claimed in claim 1, characterized in that a relative rotating angle $(\theta_h)$ is formed between the forming position $(P_n)$ and said another forming position $(P_{n+1})$ in the tank, and the 3D printing method further comprising:

providing another relative rotating angle $(\theta_1)$ such that, after the forming layer $(A_z)$ is completed, the control module driving the tank by said another rotating angle $(\theta_r)$ to rotate relative to the platform, $z=360°/(\theta_h)$, and $z<x$, $(\theta_r)\neq(\theta_h)$.

9. The 3D printing method as claimed in claim 8, characterized in that said another rotating angle $(\theta_r)$ is formed when the forming layer $(A_z)$ is completed and the control module drives the tank to rotate relative to the platform to remove the forming layer $(A_z)$ from the tank.

10. The 3D printing method as claimed in claim 8, characterized in that said another rotating angle $(\theta_r)$ is an angle by which the control module drives the tank again to rotate relative to the platform after the forming layer $(A_z)$ is competed and the control module drives the tank to rotate relative to the platform to remove the forming layer $(A_z)$ from the tank.

11. The 3D printing method as claimed in claim 1, characterized in that a minimum rotating angle is kept between the forming position $(P_n)$ and said another forming position $(P_{n+1})$ in the tank, and the minimum rotating angle is smaller than 180°.

* * * * *